Sept. 7, 1965                J. B. KRUGER ETAL                3,204,338
                     RAZOR HAVING A COMPOSITE HANDLE
Filed Nov. 23, 1964                                       5 Sheets-Sheet 1
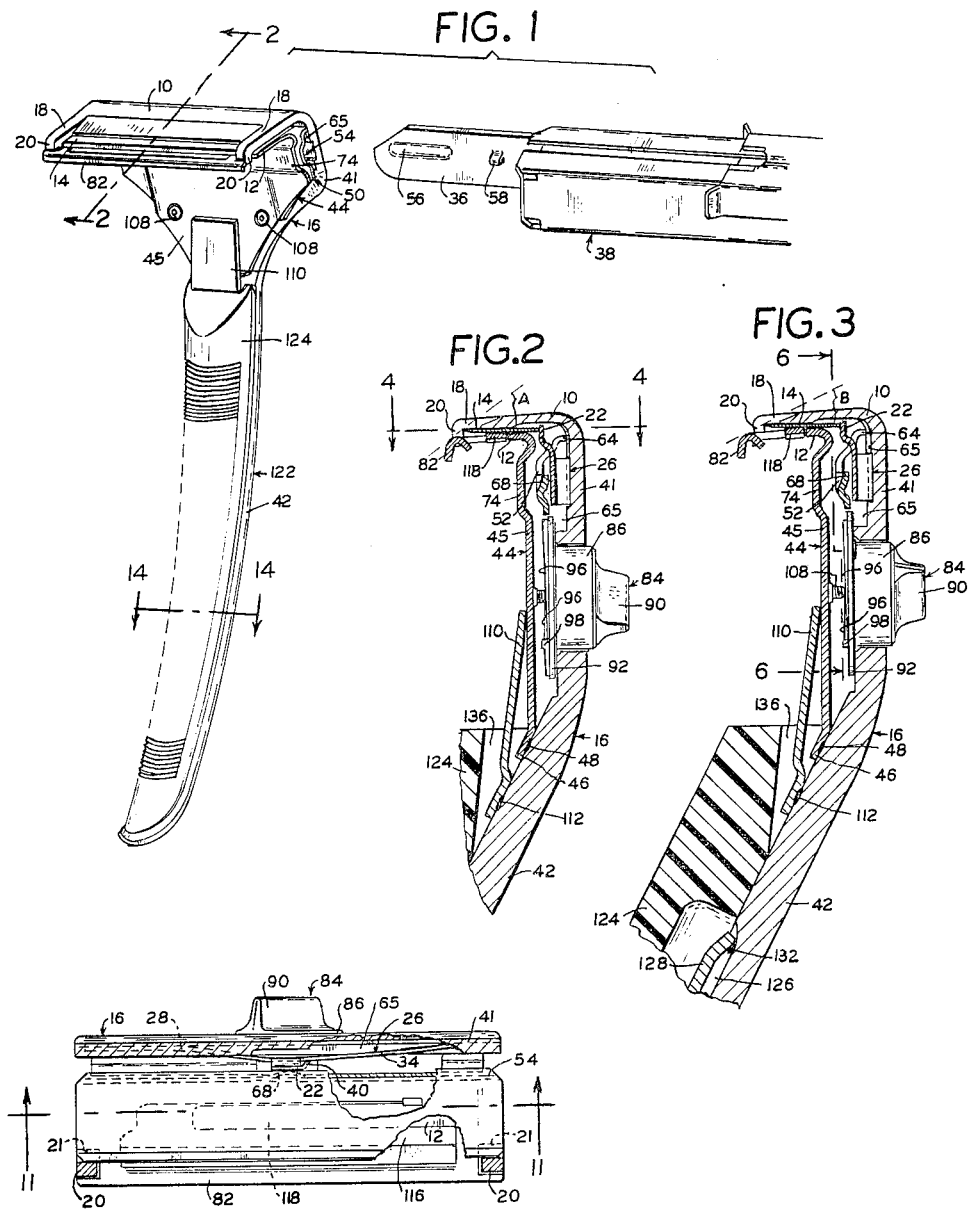
INVENTORS
James B. Kruger
BY Robert L. Bordeau
Robert Irving Williams
ATTORNEY Sept. 7, 1965   J. B. KRUGER ETAL   3,204,338
RAZOR HAVING A COMPOSITE HANDLE
Filed Nov. 23, 1964   5 Sheets-Sheet 2

INVENTORS
James B. Kruger
BY Robert L. Bordeau
Robert Irving Williams
ATTORNEY

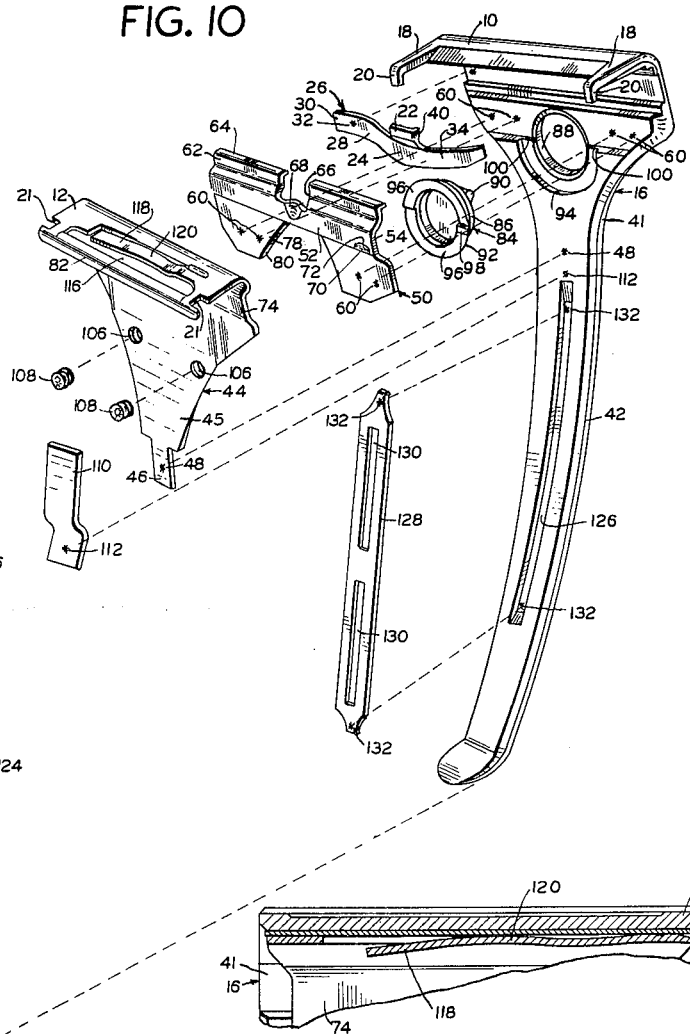
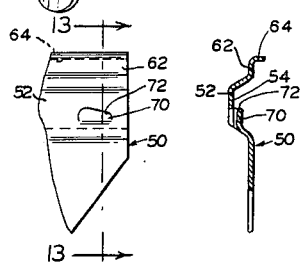

Sept. 7, 1965    J. B. KRUGER ETAL    3,204,338
RAZOR HAVING A COMPOSITE HANDLE
Filed Nov. 23, 1964    5 Sheets-Sheet 4

INVENTORS
James B. Kruger
BY Robert L. Bordeau
Robert Irving Williams
ATTORNEY

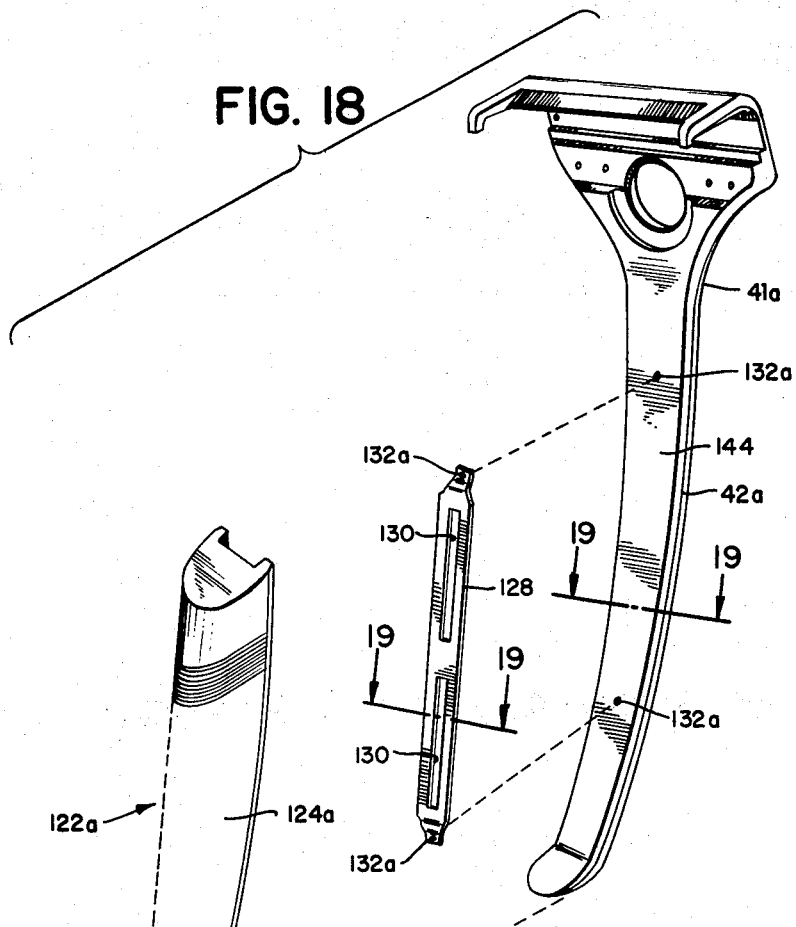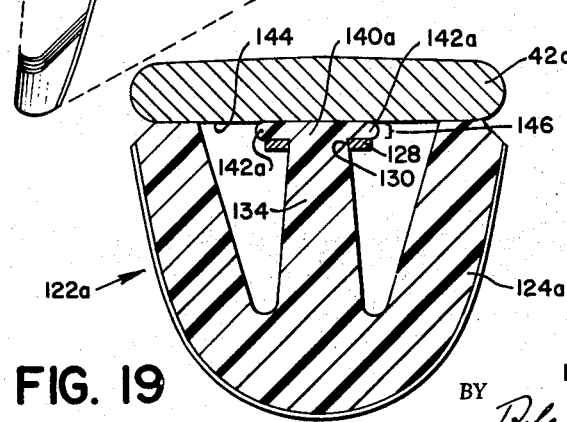

United States Patent Office 3,204,338
Patented Sept. 7, 1965

3,204,338
RAZOR HAVING A COMPOSITE HANDLE
James B. Kruger and Robert L. Bordeau, Staunton, Va., assignors to Philip Morris, Incorporated, New York, N.Y., a corporation of Virginia
Filed Nov. 23, 1964, Ser. No. 413,225
5 Claims. (Cl. 30—63)

This application is a continuation-in-part of our co-pending application Serial No. 250,946 filed January 11, 1963.

The present invention relates to razors, and particularly to those adapted for use as injector razors, having composite handles and provides a razor having a handle spine to which a plastic handle piece is secured in a particularly economical and effective manner.

One feature of the invention is the provision of slotted means forwardly of a relatively wide space at the forward side of a handle spine and the provision of a plastic handle piece with an integral rib extending thru the slot of the slotted means and a plastic enlargement extending laterally of the rib into this wide space for holding the plastic handle piece on the spine. For example, there may be provided a handle assembly including plastic means joining a plastic handle piece and a metal handle spine of a razor. A highly effective arrangement can be economically provided by means of a longitudinally slotted metallic strip secured at or toward its upper and lower ends to the metal spine and spaced forwardly of the bottom of a longitudinal groove in the razor, forwardly of a main forward surface thereon, or forwardly of another suitable part thereof.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following detailed description taken in connection with the accompanying drawings in which:

FIGURE 1 is a perspective view of the razor embodying the invention and shown in association with an injector magazine;

FIG. 2 is a partial sectional view on the line 2—2 of FIG. 1 showing the razor in one extremity of its adjustment;

FIG. 3 is a similar view showing the razor in the other extremity of its adjustment;

FIG. 4 is a sectional view on the line 4—4 of FIG. 2 with part of the blade and cap broken away;

FIG. 10 is an exploded view showing the parts of the razor of FIGS. 1–9;

FIG. 11 is a sectional view on the line 11—11 of FIG. 4;

FIG. 12 is a fragmentary front view of the key-guide plate showing the lance-cam;

FIG. 13 is a fragmentary sectional view of the lance-cam on the line 13—13 of FIG. 12;

FIG. 18 is an exploded view showing the parts of a modified form of razor handle; and FIG. 19 is a view similar to FIG. 14 and further showing this modified form of construction.

Figure 5:
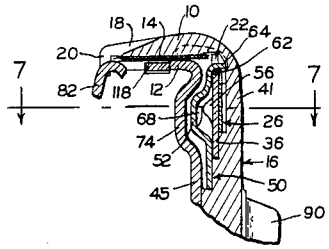
FIG. 5 is a sectional view similarly to the upper portion of FIG. 2 and showing the razor with the injector key inserted.

The razor exemplified in FIGS 1–17 is of the injector type and comprises upper and lower members 10 and 12, which for the sake of convenience of terminology are designated, respectively, as the "cap" and "blade seat" and which are adapted to receive a (rigid single-edge) injector blade 14 therebetween. The blade seat 12, which is forwardly and rearwardly movable for purposes hereinafter described, is formed with means hereinafter described which serves in the present instance, to press the blade upwardly against the underside of the cap 10. The cap 10 is part of a stainless steel frame member 16, and is formed at its forward ends with forwardly-extending members 18 carrying downwardly-extending blade stops 20, which in the present instance, extend downwardly into cut-outs 21 in the blade seat; the cut-outs 21 being of sufficient extent to permit forward and rearward movement of the blade seat relative to the stops 20. The rear (dull) edge of the blade is normally engaged by and the blade thrust against the blade stops 20 by a tab 22 extending upwardly and forwardly from a central forward portion 24 of a laterally-extending forwardly-bowed portion of a blade-spring 26, one arm 28 of which is mounted by an attaching tab arm 30 secured in place against, as in the present instance being spot welded to, the frame member 16 at attaching point 32 at one (the left side of FIGS. 1 and 4) of the razor; and the other arm 34, which is arcuate in shape is adapted to be contacted by the key 36 of an injector magazine entering from the other side of the razor, a standard form of which key is shown at 38. The key engages the forwardly-sloping arcuate arm 34 and flattens the bowed portion of the blade-spring so as to move the tab 22 rearwardly when a new blade is to be injected. The tab 22 is provided with a rolled-over surface 40 to assure that the injector key 36 will slide past it.

The frame member 16, as exemplified, comprises a downwardly-extending arm 41 which is tapered and curved toward and terminates in a handle-spine section 42 as best seen in FIG. 10. The blade seat 12 is part of a stainless steel member 44 which comprises a shank 45 which extends downwardly from the seat 12 and is formed with a lower end tapering downwardly similarly to frame 16 and having a reduced laterally central tab portion 46 which is attached to handle section 42 at attaching point 48 by means of a spot-weld. Behind the member 44 there is fitted a key guide plate 50 the major portion of which is spaced sufficiently forward of the arm 41 to admit the key 36 of a magazine 38 and which is formed to guide the key along a path in which it will contact the sloping arcuate arm 34 and flatten the spring 26. Because of the arcuate shape of the arm 34, a particular smooth flattening action is achieved. The term "flattening" is used herein to include a partial as well as a complete flattening; but the flattening should be, and as exemplified is, sufficient to leave ample room behind the blade stops 20 for a new blade to be moved into the razor without its cutting edge contacting the blade stops. The key guide plate 50 is bent out forwardly forming a front wall 52 at its right-hand (FIG. 4) end portion to provide a channel 54 for the receiving of the usual bump 56 and depending protuberance 58 on the key. The lower end portions of the key guide plate 50 are welded at 60 to the arm 41. The key guide plate 50 extends upwardly at 62 and then rearwardly at 64 to contact the arm 41 and providing the top of a channel 65 between the arm 41 and the key guide plate 50 for the reception of a key such as 36. At its central portion, the entire upper part of the key guide plate 50 is cut away at 66 (below the top of the channel 54, in the present instance), to provide a spring relief admitting the tab 22. The front wall 52 has formed therein a rearwardly protruding dimple 68 centrally located and extending from the edge of cut 66 into wall 52. A pressed-out cam 70, located a short distance in from the right-hand edge (FIG. 12) of the wall 52, is made by partially cutting a portion of wall 52 and pushing this severed portion rearwardly into channel 54; the bottom edge remaining attached to the key guide plate 50 as seen in FIGS. 12–13. The cam 70 has a guide surface 72 sloped toward the righthand edge of wall 52. This surface engages and guides upwardly the protuberance 58 as the key 36 is fully inserted into the razor, thus assuring proper alignment of the key.

The member 44 is provided with a forwardly-bent-out portion 74 to accommodate the front wall 52. It is to be observed that the key guide plate 50 has sufficient firmness so that the insertion of a key such as 36 will not move it significantly, but will serve merely to flatten out the bowed portion of the blade-spring 26, thus moving the tab 22 rearwardly so as to be out of the way of an incoming blade and so as to release a used blade for movement out of the razor ahead of the incoming blade. The dimple 68 engages key 36 as it is inserted and finally engages bump 56 just before full insertion. Dimple 68 as it is contacted by key 36 urges said key rearwardly so that the leading edge of the key avoids accidental engagement with the (far) left-hand edge (FIG. 10) of cut 66 in key guide plate 50. Additionally, dimple 68, by engaging bump 56 when the key 36 is fully engaged, assists in aligning key 36 and in urging key 36 rearward to in turn flatten blade-spring 26. During its movement into the razor the cutting edge of the new blade will, as above indicated, be sufficiently rearward of the near blade stop 20 so that the cutting edge will not be dulled by coming into contact with it. When the key 36 is withdrawn, however, the tab 22 will press the new blade forwardly so that the ends of its cutting edge will contact the blade-stops.

Figure 6:
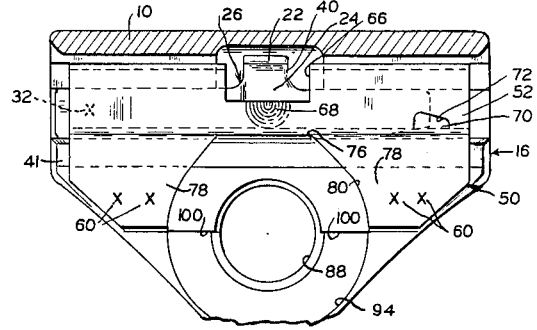
FIG. 6 is a sectional view on the line 6—6 of FIG. 3 with the button removed.
Figure 7:
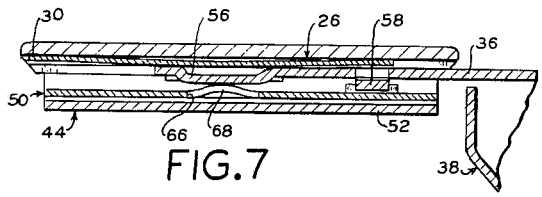
FIG. 7 is a sectional view on the line 7—7 of FIG. 5.
Figure 8:
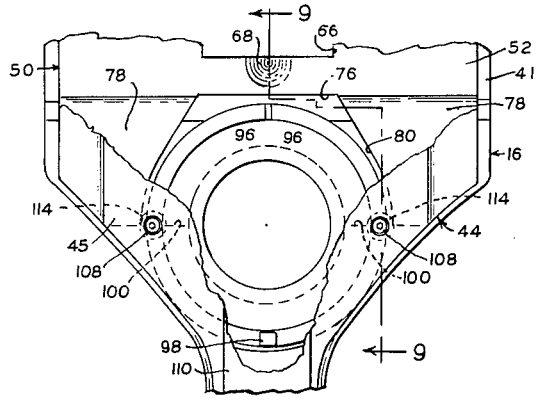
FIG. 8 is a partial front view of the blade seat shank with portions broken away to show the rotary cam means.

The key guide plate 50 is cut away at 76 (FIG. 6). At its lower portion, the key guide plate 50 carries two depending tabs 78, the outer edges having portions tapered to coincide with the taper of arm 41, the inner edges of the tabs defining a semi-circular opening 80 providing clearance for a purpose to be hereinafter described.

Figure 9:
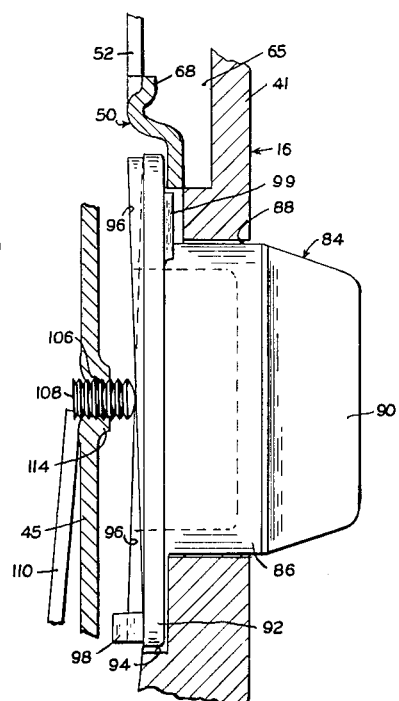
FIG. 9 is a sectional view on the line 9—9 of FIG. 8 on an enlarged scale.

The forward end of the blade seat 12, as exemplified, forms an integral guard 82 which as constructed lends itself particularly well to the adjustment of the shaving angle between the guard 82 and the cutting edge of a blade 14 by a rearward and forward movement of the blade seat and there is exemplified a highly effective means for effecting said movement. To this end, there is provided an adjusting button 84 having a head 86 rotatably mounted in a circular opening 88 in the arm 41. The head 86 is formed with a gripping rib 90. Forwardly of the head is an enlarged flange 92 freely rotatable in an opening of which the lower half is an opening 94 in the arm 41 and the upper half is the semi-circular opening 80 in the key guide plate 50. On the front face of flange 92 there are formed oppositely-disposed similarly-acting inclined cam faces 96 each cam surface being identically formed and spaced one hundred eighty degrees apart as shown in FIGS. 9 and 10, and each rising in a counter-clockwise direction (FIG. 10). An emergency stop block 98 forwardly projected and formed on the front face of flange 92 is disposed between the termination of one cam face 96 and start of another cam face 96 for a purpose to be hereinafter described. On the rear face of flange 92 there is formed a rearwardly projecting stop segment 99 (FIG. 16) to limit the rotation of button 84. Formed on arm 41 and adjacent to opening 88 are shoulders 100 adapted to engage the edges 102 of segment 99 as the button is rotated. Indicia 104 are applied to the rear surface of the arm 41 (FIG. 17) to indicate varying positions of the gripping rib 90.

As exemplified, the shank 45, which may possess a rearward resilience, is positively urged rearwardly by means hereinafter to be described; and is accordingly urged rearwardly in one or the other or both of these manners. In order to forwardly-and-rearwardly adjust the guard with respect to the blade stops 20 to vary the cutting angle of the blade, the shank 45 carries a pair of rearwardly extending nubs bearing respectively on the cam surfaces 96 of the adjusting button 84. In the present instance, these nubs are in the form of spherically pointed contacts 108 which as exemplified are commercial spherically pointed socket set screws, for enabling the shank 45 to be flexed so that the two ends of the blade seat and the guard will be in uniform alignment with the blade stops and, consequently with the blade. When adjusted, the contacts serve to maintain the blade seat, and consequently the guard, in alignment with the cap regardless of the forward-and-rearward movement of the seat, and regardless of any "warpage" or lack of uniformity in the contour of or strains in the shank 45, which may have resulted from manufacturing procedures, and which would otherwise tend to cause a lack of parallelism between the seat 12 and the cap 10 and consequently between the guard 82 and the blade edge. There are therefore provided in the shank 45, and spaced on opposite sides of the vertical center line thereof, threaded holes 106 having within them a pair of spherically pointed contacts 108. By adjusting the contacts 108 the member 44 can be precisely aligned so as to assure that guard 82 will be properly parallel to the cutting edge of blade 14. It is to be further noted that member 44 is attached to the arm 41 only by a narrow tab 46 so as to minimize the force required to overcome "warpage" and to assure precise alignment. In order to urge the member 44 positively rearwards, there is provided a spring member 110 attached at 112 to handle section 42, the upper end of the spring bearing against member 44 at a portion thereof which is at least substantially as low as, and in the present instance in line with the contacts 108 and opposite the adjusting button 84. Because the spring is effective only at this low point, neither the aligning action of the adjusted contacts nor the effective operation or shank-positioning action of the rotary button is interfered with. On the rearward side of member 44 there are bosses 114 (FIGS. 8 and 9) around both threaded holes 106 providing additional threads in holes 106. The contacts 108 further provide emergency stop limits for engagement by stop block 98 if the occasion should arise when shoulders 100 ride over or fail to engage edges 102. The provision of an emergency stop insures that the indicia 104 and the gripping rib 90 will always indicate the desired amount of cam action by cams 96 to move seat 12 between the position of FIG. 2, wherein there is provided a shaving angle A (of 35° in the present instance) and the position of FIG. 3, wherein there is provided a shaving angle B (of 25° in the present instance).

The blade seat 12 is provided with the usual longitudinal opening 116 and is formed rearwardly thereof with a cut-out spring 118 bowed upwardly at 120 and secured at its right-hand end (FIGS. 10 and 11) and with its free end at the left, and serving to assure that the blade is effectively pressed upwardly against the underside of the cap 10 at all times. As will be seen particularly in FIGS. 2 and 3, the blade seat contour is slightly arcuate in cross section to facilitate its forward and rearward movements.

Figure 14:
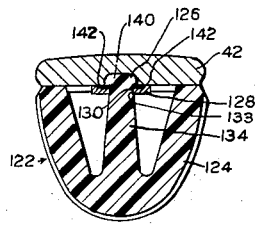
FIG. 14 is an enlarged sectional view of the handle assembly on the line 14—14 of FIG. 1.
Figure 17:
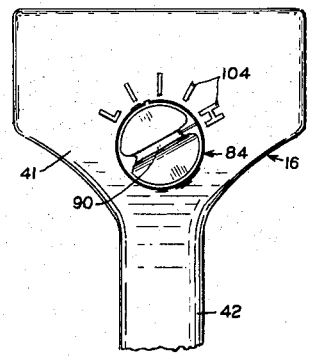
FIG. 17 is a rear view of the upper portion of the razor showing the adjustment corresponding to FIGS. 1–4.
Figure 15:
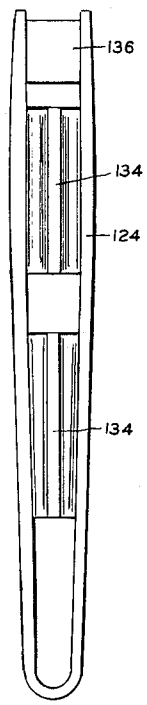
FIG. 15 is a rear view of the plastic grip member prior to the formation of the plastic enlargement.
Figure 16:
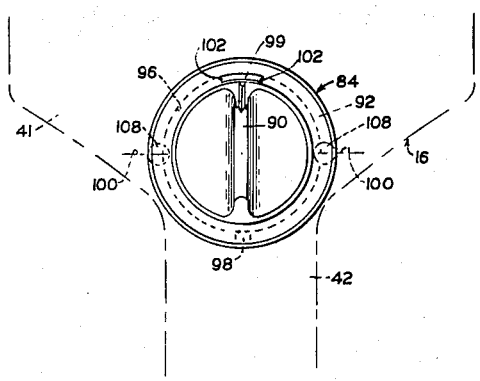
FIG. 16 is a rear view of the rotary cam button showing the grip member and stop cam.

The razor is provided with a handle 122, the rear and bottom portions of which are provided by the handle-spine 42 of the frame 16 and the forward portion of which is provided by a grip member 124 formed of plastic and having a roughened or serrated surface. The forward surface of the handle-spine 42 is formed with a longitudinal groove 126 over which is placed a grip-clip 128 having longitudinal openings 130 therethrough. Grip-clip 128 is attached to the handle at points 132 and is contiguous to the forward surface of handle 42 to provide a wide space between the bottom of the groove and the grip-clip. Openings 130 are of a lesser width than groove 126, the combination forming, as exemplified, a pair of T-slots 133 into which there are fitted a pair of ribs 134, on grip member 124 (FIGS. 14 and 15). The grip member is cut away at the rear of its upper end to provide a recess 136 to receive the spring 110 and tab end 46 of member 44. In the heads of the T-slots there is provided a plastic enlargement 140 for securely holding the grip member 124 on the handle spines 42. It is to be noted that the ribs 134 of the grip member 124 are formed to contact the back of groove 126. The handle-spine 42 can thus be locally heated in the region of the T-slots, and the terminal portions of the ribs 134 are melted so that the plastic will flow laterally to form a plastic enlargement 140 including shoulders 142 in the head of the T-slots for holding the grip member 124 on the handle spine 42.

The razor exemplified in FIGS. 18 and 19 is similar to that shown in FIGS. 1-17 except that, instead of the handle spine having a groove such as 126 there is provided a handle spine 42a provided with a smooth forward face 144, and instead of the grip clip 128 having its ends welded at 132 to the base of the groove 126, it has its ends welded to the face 144 at points 132a located similarly to the points 132 but forwardly thereof so as to provide a space 146 between the face 144 and the grip clip, the space 146 thus being wider than the slots 130 in the grip clip. In the space 146 there is provided (in the manner indicated above or otherwise) plastic enlargements 140a of the rib 134a of plastic grip arm 124a. Each enlargement 140a is provided with shoulders 142a. There is thus provided a handle 122a without requiring the provision of the groove 126 in the handle spine.

Since certain changes may be made in the above article and different embodiments of the invention could be made without departing from the scope thereof, it is intended that all matter contained in the above description or shown in the accompanying drawings shall be interpreted as illustrative and not in a limiting sense.

We claim:

1. A razor comprising a razor head embodying a pair of members adapted to receive a blade therebetween, a metallic arm extending downwardly from one of said members to provide a handle-spine, and means providing a relatively narrow longitudinal opening forwardly of a relatively wide space at the forward side of said handle-spine, a plastic handle piece with an integral rib extending into said opening, and a plastic enlargement at the rearward portion of said rib and extending laterally thereof into said space and holding the plastic handle piece on the spine.

2. A razor as in claim 1 wherein said means providing a relatively narrow longitudinal opening is a grip-clip disposed forwardly of said metallic arm and having a portion spaced forwardly of said metallic arm to provide said space and having a relatively narrow longitudinal opening therein and having portions longitudinally beyond said portion and secured to said metallic arm.

3. A razor comprising a razor head embodying a pair of members adapted to receive a blade therebetween, a metallic arm extending downward from one of said members and providing a handle-spine, a longitudinal groove formed in the forward surface of said spine, a grip-clip attached to the spine and formed with at least one longitudinal slot overlying said groove and narrower than said groove thereby providing internal shoulders, a plastic handle piece with an internal rib extending into said slot and groove, and a plastic enlargement integral with a plastic rib and providing shoulders under the grip-clip at both sides of the groove binding the plastic handle to the spine.

4. An injector razor comprising a cap and a blade seat arranged to receive a blade therebetween, an arm extending downwardly from said cap, a shank extending downwardly from said seat and forwardly of said arm, rotary means carried by said arm for adjusting the relative position of said arm and said shank to vary the cutting angle of a blade so received, rearwardly projecting contacts carried on said shank on opposite sides of the vertical center-line of said shank for aligning said cap and seat and contacting said rotary adjusting means, a metallic handle-spine depending from said arm, means providing a relatively narrow longitudinal opening forwardly of a relatively wide space at the forward side of said handle-spine, a plastic handle piece with an integral rib extending into said opening, and a plastic enlargement at the rearward portion of said rib and extending laterally thereof into said space and holding the plastic handle piece on the spine.

5. An injector razor comprising a cap having forward blade stops thereon, an arm extending downwardly therefrom and providing a depending handle-spine, a blade seat, a shank extending downwardly from the blade seat and forwardly of said arm, a bowed blade-spring having a rearwardly-extending free lateral end portion and attached to the arm at an opposite end portion and having a portion adapted normally to press a blade against said blade stops, a guard fixed to said blade seat, a rotatable button carried by said arm for adjusting the relative position of said arm and said shank to vary the cutting angle of such a blade, cooperating stop means on the rotatable button and said arm to limit the rotation of said button, cooperating stop means on the button and said shank providing positive limits to the rotation of the button in the event that the first stop means becomes ineffective, rearwardly projecting nubs contacting said rotary button on opposite sides of the vertical center-line of said shank, a key guide plate forming with said arm a key guideway, a spring relief for said blade-spring formed in said key guideway, an inwardly formed bump in said key guideway to insure that the tip of a key of an injector magazine when inserted into said key guideway will not engage the far edge of the blade relief, a cam projecting from said guide plate into said guideway at the lower inlet portion thereof and formed with an upwardly sloping surface in the path of a depending protuberance on the portion of the key in proximity with the injector magazine, a spring attached to said arm and bearing rearwardly against a portion of said shank at least as low as said nubs, means providing at least one relatively narrow longitudinal opening forward of a relatively wide space at the forward side of the handle-spine, a plastic handle piece with an integral rib extending into said opening, and a plastic enlargement at the rearward portion of said rib and extending laterally thereof within said space and holding the plastic handle piece on the spine.

References Cited by the Examiner
UNITED STATES PATENTS 2,952,910   9/60   Meohas _____ 30—32
3,128,551   4/64   Crown _____ 30—63

WILLIAM FELDMAN, *Primary Examiner.*

MYRON C. KRUSE, *Examiner.*